United States Patent
Fujita

[19]

[11] Patent Number: 6,052,353

[45] Date of Patent: Apr. 18, 2000

[54] DOUBLE REFRACTION PLATE WITH REFRACTIVE GRATING PATTERN AROUND A CENTERALLY DISPOSED TRANSPARENT REGION TO ALLOW THE PASSAGE OF EITHER AN ORDINARY RAY OR AN EXTRAORDINARY RAY

[75] Inventor: Mitsuru Fujita, Kouza-gun, Japan

[73] Assignee: Toyo Communication Equipment Co., Ltd., Kanagawa, Japan

[21] Appl. No.: 08/945,279

[22] PCT Filed: Feb. 20, 1997

[86] PCT No.: PCT/JP97/00464

§ 371 Date: Oct. 16, 1997

§ 102(e) Date: Oct. 16, 1997

[87] PCT Pub. No.: WO97/31371

PCT Pub. Date: Aug. 28, 1997

[30] Foreign Application Priority Data

| Feb. 23, 1996 | [JP] | Japan | 8-061927 |
| Sep. 4, 1996 | [JP] | Japan | 8-253851 |
| Feb. 19, 1997 | [JP] | Japan | 9-050993 |

[51] Int. Cl.[7] ............................. G11B 7/135; G02B 5/30; G02B 5/18

[52] U.S. Cl. .................. 369/112; 369/44.24; 369/44.37; 369/94; 369/118

[58] Field of Search ............................. 369/110.118, 112, 369/109, 103, 44.24, 44.37, 94, 44.23; 359/495, 494, 572, 332, 328; 349/17, 15, 177

[56] References Cited

U.S. PATENT DOCUMENTS

| 4,885,734 | 12/1989 | Yuzo | 369/44.23 |
| 5,535,055 | 7/1996 | Ono et al. | 359/495 |
| 5,619,369 | 4/1997 | Yamamoto et al. | 359/332 |
| 5,648,950 | 7/1997 | Takeda et al. | 369/110 |
| 5,841,489 | 11/1998 | Yoshida et al. | 349/17 |

FOREIGN PATENT DOCUMENTS

| 2-156205 | 6/1990 | Japan . |
| 3-31803 | 2/1991 | Japan . |
| 5-120720 | 5/1993 | Japan . |
| 5-196813 | 8/1993 | Japan . |
| 6-124477 | 5/1994 | Japan . |
| 7-65407 | 3/1995 | Japan . |
| 7-311945 | 11/1995 | Japan . |
| 9-50648 | 2/1997 | Japan . |

*Primary Examiner*—Tan Dinh
*Assistant Examiner*—Kim-Kwok Chu
*Attorney, Agent, or Firm*—Koda & Androlia

[57] ABSTRACT

An optical element has a diffraction grating pattern formed on a double refracting thin plate around a centrally-disposed region of a desired shape. The diffraction grating pattern is composed of equally spaced ion exchange regions each having a predetermined width, a predetermined length and a predetermined thickness in the direction of optical axis of incident light thereon and dielectric films each formed all over the top surface of one of the ion exchange region. The thicknesses of each ion exchange region and each dielectric film are selected such that the diffraction grating pattern allows the passage therethrough of an ordinary ray and inhibit the passage therethrough of a zero-order diffracted wave of an extraordinary ray. The optical element permits implementation of an easy-to-handle optical pickup that facilitates miniaturization of the playback system.

8 Claims, 7 Drawing Sheets

DOUBLE REFRACTION PLATE WITH REFRACTIVE GRATING PATTERN AROUND A CENTERALLY DISPOSED TRANSPARENT REGION TO ALLOW THE PASSAGE OF EITHER AN ORDINARY RAY OR AN EXTRAORDINARY RAY

BACKGROUND OF THE INVENTION

1. Field of the Invention

The present invention relates to an optical pickup and an optical element or device for use therein and, more particularly, to an optical pickup that can be used equally for two optical recording media of different thicknesses and hence different in the distance from the optical pickup held in its playback position to their recording surfaces.

2. Prior Art

A digital video disk (hereinafter referred to as a DVD) has a recording capacity six to eight times larger than those of a compact disk (CD) and a laser disk (LD) now in wide use, and hence it is recognized as a next-generation recording medium.

Such a large recording capacity of the DVD is accomplished by increasing the recording density on the disk and numerical aperture (N.A.) of an objective lens in the playback system. That is, the spot diameter of laser beam irradiated on the disk surface is reduced by using an object lens having large numerical aperture (N.A.), thereby permitting the readout of information recorded in the disk surface with high density.

On the other hand, as the numerical aperture (N.A.) of the objective lens increases, the readout of information becomes more and more affected by aberration or birefringence (double refraction) attributable to the disk thickness. Therefore, a tilt angle, which is an angle between the horizontal plane of the disk and the orthogonal plane with respect to the optical axis of the optical pickup, should be minimized, and the allowed value of the tilt angle becomes small. However, it is impossible to play back the disk according to its warpage.

The influence of the tilt angle with respect to an incidence of an error is expressed by $A*d*(N.A.)^3$, where A is a coefficient and d is the disk thickness. As a solution to this problem, it is general practice in the prior art to decrease the DVD thickness to reduce the optical path over which laser beam enters the disk at its surface and is reflected from the plane of recording of the disk and back to the disk surface so that the desired allowed tilt angle can be retained even when the numerical aperture (N.A.) is large.

To this end, the DVD thickness is set at 0.6 mm, i.e., one-half the thickness t=1.2 mm of a conventional CD and an objective lens of a large numerical aperture is used to reduce the spot diameter of laser beam so as to accomplish a stable readout of data.

Incidentally, the CD has already become widespread as a disk-shaped storage medium. Since the DVD and the CD (including a video CD) are common in outer dimensions and are similar in the manner of use, that is, since the DVD is expected to be used in place of CD as a optical recording media having high sound quality, there is a demand for a DVD/CD-compatible playback system equipped with both DVD and CD playback functions.

When a CD and a DVD, each having different thicknesses are played back by the same reproducing device with an ordinary optical system, the spot diameter of laser beam on the CD with the larger thickness becomes too large to read out data therefrom. To solve this problem, there have been proposed so far various methods that enable the same playback system to be used equally for playing back two optical recording media of different thicknesses.

A first one of the conventional methods employs two optical pickups for a 0.6-mm thick disk (DVD) and for a 1.2-mm thick disk (CD) in the playback system and switches them from one to the other according to the kind of the disk to play back. With this method, however, the playback system is inevitably bulky and costly.

A second method employs two objective lenses for the DVD and for CD provided in the optical pickup and switches them from one to the other according to the kind of the disk to play back. This method also has a defect that the playback system becomes bulky.

A third method is to implement two focal lengths by one optical pickup as disclosed in Japanese Pat. Laid-Open Gazette No. 311945/95. This is shown in FIG. 8, in which the power of a light source 1 is selectively switched to emit therefrom an optical beam 17a or 17b of a different diameter for incidence on an objective lens, thereby creating an optical beam of a different focal length 18a or 18b. With this method, the playback system can be made smaller than in the cases of the first and second methods mentioned above.

Since the third method depends largely on the light source, however, it has a disadvantage that the desired beam diameter may sometimes be unobtainable due to aging of the light source. In such an instance, an error will arise in the focal length, changing the optical spot diameter on the disk accordingly, and hence introducing a readout error.

SUMMARY OF THE INVENTION

It is therefore an object of the present invention to provide an easy-to-handle optical pickup that has compatibility between optical recording media of different thicknesses and permits miniaturization of the playback system. The invention also pertains to an optical element or device for use therein.

In order to achieve the object described the above, the optical element comprises a double refracting thin plate of the present invention includes (a) a diffraction grating pattern formed thereon around a centrally-disposed region of a desired shaped, and (b) the diffraction grating pattern is composed of equally spaced ion exchange regions each having a predetermined width, a predetermined length and a predetermined thickness in the direction of the optical axis of incident light, and (c) dielectric films each formed over the entire area of the top of one of the ion exchange regions, and (d) the thicknesses of each ion exchange region and each dielectric film are selected such that the diffraction grating pattern allows the passage therethrough of an ordinary ray incident on the double refracting thin plate and inhibits the passage therethrough of a zero-order diffracted wave of an extraordinary ray.

More specifically, letting the refractive indexes of the double refracting thin plate for the ordinary and extraordinary rays be represented by $n_{1o}$ and $n_{1e}$, the refractive indexes of each ion exchange region for the ordinary and extraordinary rays by $n_{2o}$ and $n_{2e}$, the thickness of each ion exchange region by $d_2$ and the refractive index and thickness of each dielectric film by $n_3$ and $d_3$, respectively, the thicknesses $d_2$ and $d_3$ of each ion exchange region and each dielectric film are set at values that satisfy the following conditions:

$$(n_{1o}-n_{2o})d_2+(1-n_3)d_3=0$$

$$(n_{1e}-n_{2e})d_2+(1-n_3)d_3=\lambda/2$$

According to another aspect of the present invention, the optical element comprises a double refracting thin plate and a diffraction grating pattern formed thereon around a centrally-disposed region of a desired shape. The diffraction grating pattern is composed of equally spaced projections and depressions of a double refractive material each having a predetermined width, a predetermined length and a predetermined thickness in the orientation of the optical axis of incident light and ion exchange regions each formed in one of the depressions to a predetermined thickness in the direction of the optical axis of the incident light. The thicknesses of each projection and each ion exchange region are selected such that the diffraction grating pattern allows the passage therethrough of an extraordinary ray incident on the double refracting thin plate and inhibits the passage therethrough of a zero-order diffracted wave of an ordinary ray.

More specifically, letting the refractive indexes of each projection for said ordinary and extraordinary rays be represented by $n_{1o}$ and $n_{1e}$, the thickness of each projection by $d_1$, the refractive indexes of each ion exchange region for the ordinary and extraordinary rays by $n_{2o}$ and $n_{2e}$, and the thickness of each ion exchange region by $d_2$, the thicknesses $d_1$, and $d_2$ of each projection and each ion exchange region are set at values that satisfy the following conditions:

$$(n_{1o}-1)d_1+(n_{1o}-n_{2o})d_2=\lambda/2$$

$$(n_{1e}-1)d_1+(n_{1e}-n_{2e})d_2=0$$

Another aspect of the present invention, the region formed in the double refracting thin plate centrally thereof is made of a double refractive material.

According to another aspect of the present invention, the region formed in the double refracting thin plate centrally thereof is circular in shape.

According to still another aspect of the present invention, the optical pickup employing the optical element, comprises: a light source; a non-polarized beam splitter disposed on the optical path of light that is emitted from the light source; the optical element; an objective lens; and direction-of-polarization changing means. The orientation-of-polarization changing means is interposed between the non-polarized beam splitter and the optical element to thereby change the orientation of polarization of linearly polarized light incident on the optical element to control the beam diameter of light that is emitted therefrom, selectively changing the focal length of light that is converged by the objective lens.

DESCRIPTION OF THE PREFERRED EMBODIMENT

Hereinafter, preferred embodiments of the present invention will be described with reference to the accompanying drawings.

Figure 1:
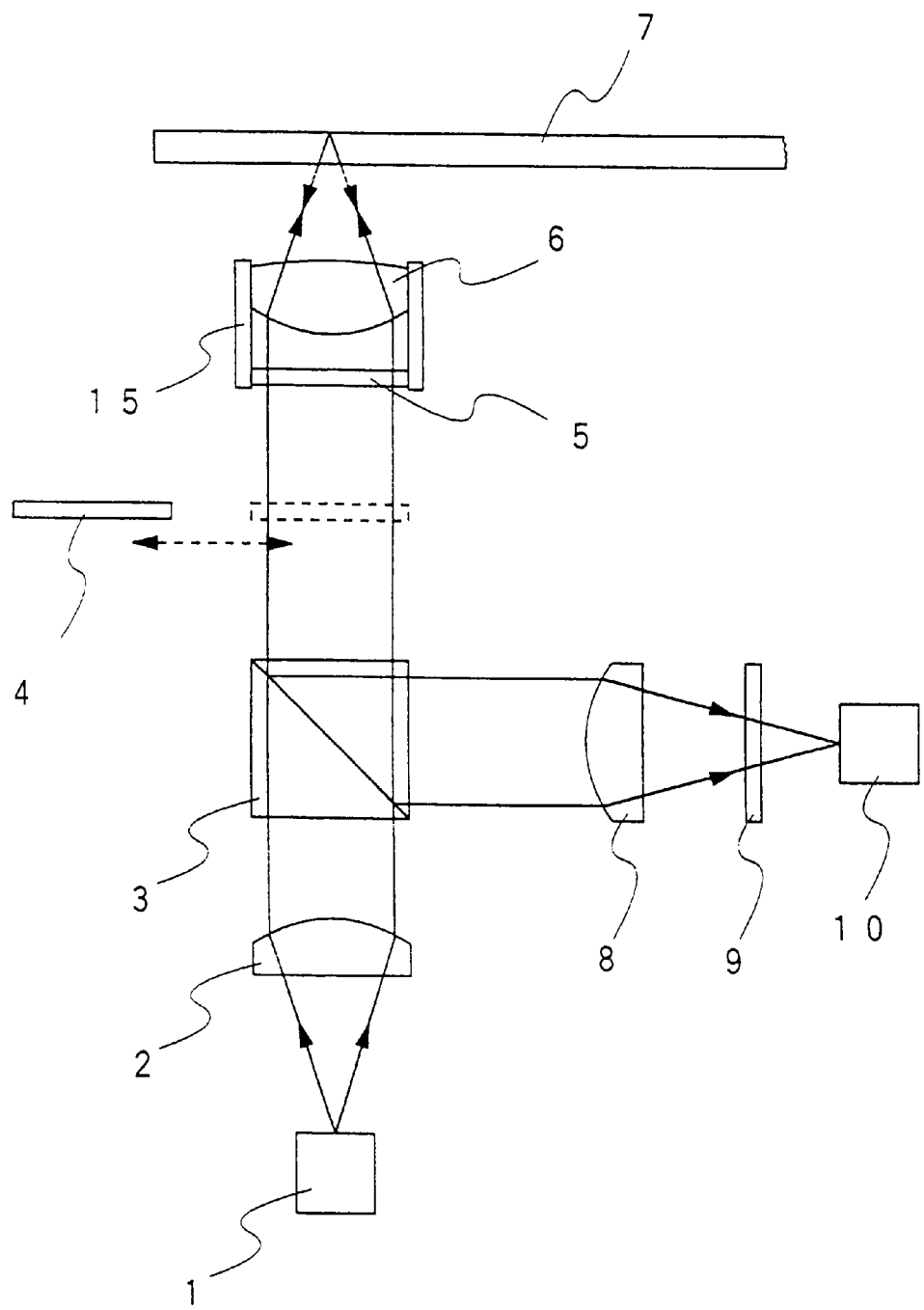
FIG. 1 is a diagram schematically illustrating the general configuration of the optical pickup according to the present invention.

FIG. 1 shows a schematically illustrated the general configuration of the optical pickup according to the present invention. Reference numeral 1 denotes a light source, 2 a collimator lens, 3 a beam splitter, 4 a halfwave plate, 5 a double refracting-thin plate, 6 an objective lens, 7 an optical recording medium, 8 a convergent lens, 9 a cylindrical lens and 10 a photodetector.

The light source 1 is, for example, a laser diode, which emits an optical beam with fixed power. The optical beam emitted from the light source 1 is linearly polarized light or made to contain only a single linearly polarized light component through the use of a proper optical device such as a polarization beam splitter, and the direction of linear polarization is set to be perpendicular to the optical axis of the double refracting thin plate 5 described later on.

The lens 2 is a collimator lens that converts the optical beam from the light source 1 into a parallel beam. The beam splitter 3 is a non-polarized beam splitter, by which the optical beam reflected from the recording plane of the optical recording medium 7 is guided to the photodetector 10.

The halfwave plate 4, which is used to change the orientation of polarization of light for incidence on the optical recording medium 7, is adapted to be placed on or off the optical path of the incident light as required. The halfwave plate 4 is disposed with its optical axis tilted 45 degrees with respect to the direction of polarization of the in early polarized incident light. With this arrangement, the direction of polarization of the linearly polarized light incident to the double refracting thin plate 5 can be rotated 90 degrees, depending on whether the halfwave plate 4 is placed on or off the optical path.

Figure 2:
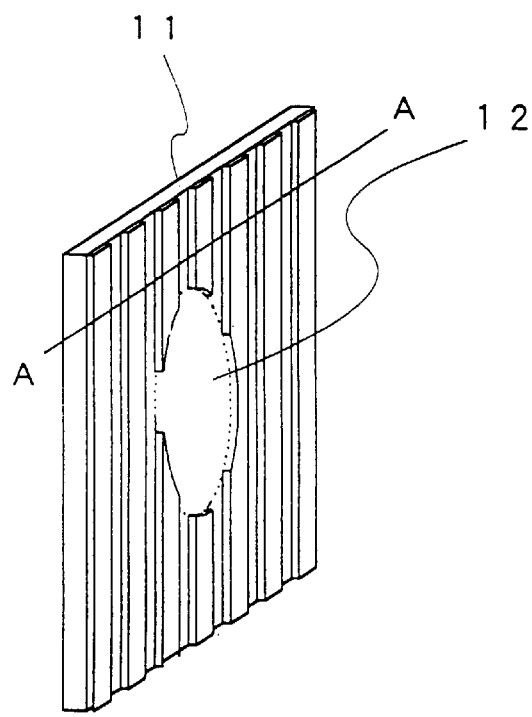
FIG. 2 is a perspective view showing the construction of a first example of a thin double refractor according to the present invention.

As depicted in FIG. 2, the double refracting thin plate 5 is a rectangular flat plate (a double refracting plate) 11 made of a transparent double refraction material such as lithium niobate ($LiNbO_3$), which has on its main surface an optical diffraction grating pattern formed around a central circular region 12.

Figure 3:
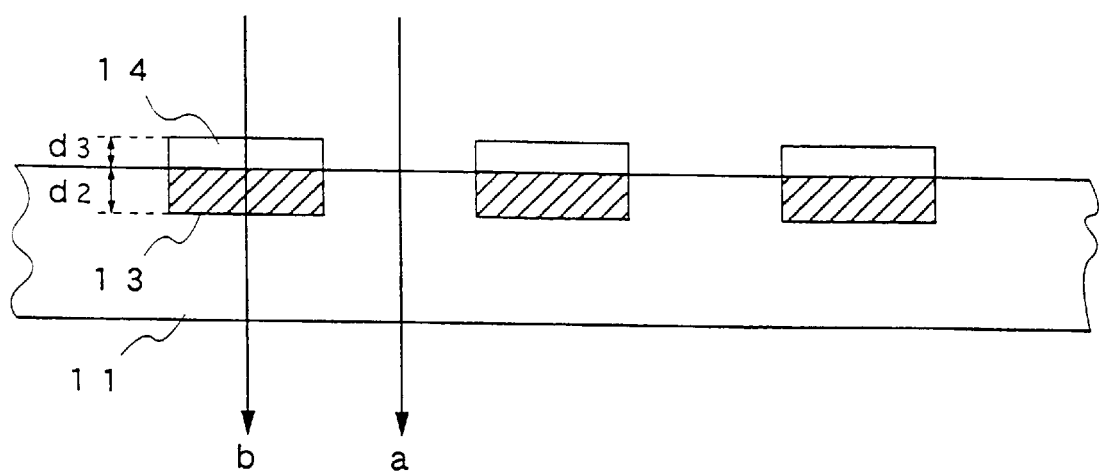
FIG. 3 is a sectional view taken on the line A—A in FIG. 2.

Now, a detailed description will be given of the diffraction grating pattern structure. FIG. 3 is a sectional view of the thin double refractor 5 taken on the line A—A in FIG. 2. The double refracting plate 11 has in its main surface ion exchange regions 13 each of which has a predetermined width, a predetermined length and a thickness $d_2$ in the direction of the optical axis of light incident thereto and is covered with a dielectric film 14 of a thickness $d_3$.

A direct transmitted wave (a zero-order diffracted wave) from the diffraction grating pattern, that is passed through the diffraction grating pattern, has a transmittance $I_0$ given by $$I_0 = \cos^2(\delta/2)$$

where δ is an optical phase difference between optical paths a and b. The phase difference differs between a polarized component perpendicular to the optical axis of the double refractor plate (an ordinary ray) and a polarized component parallel to the above optical axis (an extraordinary ray), and the phase difference $\delta_o$ for the ordinary ray and the phase difference $\delta_e$ for the extraordinary ray are given as follows:

$$\delta_o = 2\pi/\lambda\{(n_{1o}-n_{2o})d_2+(1-n_3)d_3)\}$$

$$\delta_e = 2\pi/\lambda\{(n_{1e}-n_{2e})d_2+(1-n_3)d_3)\}$$

where $n_{1o}$ is the refractive index of the double refractor plate for the ordinary ray, $n_{1e}$ the refractive index of the double refractor plate for the extraordinary ray, $n_{2o}$ the refractive index of the ion exchange region for the ordinary ray, $n_{2e}$ the refractive index of the ion exchange region for the extraordinary ray, and $n_3$ the refractive index of the dielectric film for each of the ordinary and extraordinary rays.

By setting $d_2$ and $d_3$ (the thicknesses of the ion exchange region 13 and the dielectric film 14) so that $(n_{1o}-n_{2o})d_2+(1-n_3)=0$, the transmittance $I_{0o}$ of the diffraction grating pattern for the ordinary ray becomes 1, allowing the passage therethrough of all the zero-order diffracted waves. By setting $d_2$ and $d_3$ so that $(n_{1e}-n_{2e})d_2+(1-n_3)d_3=\lambda/2$, the smittance $I_{0e}$ of the diffraction grating pattern for the a ordinary ray becomes zero, inhibiting the passage through of all the zero-order diffracted waves.

Figure 4A:
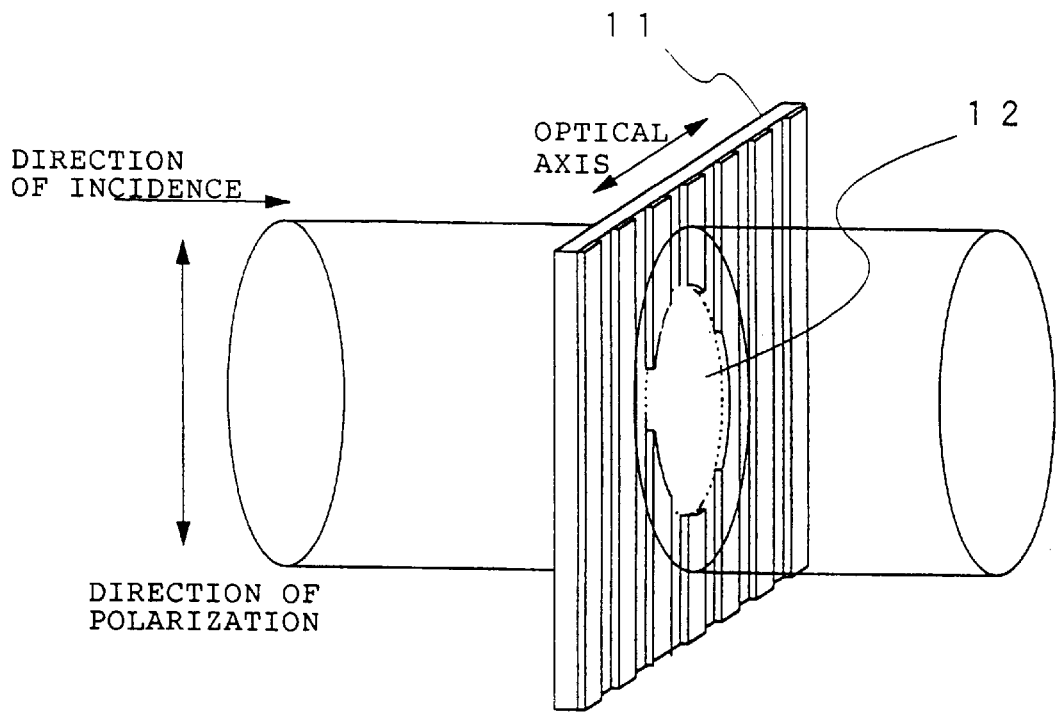
FIG. 4(a) and 4(b) are perspective views for explaining the function of the thin double refractor shown in FIG. 2.
Figure 4B:
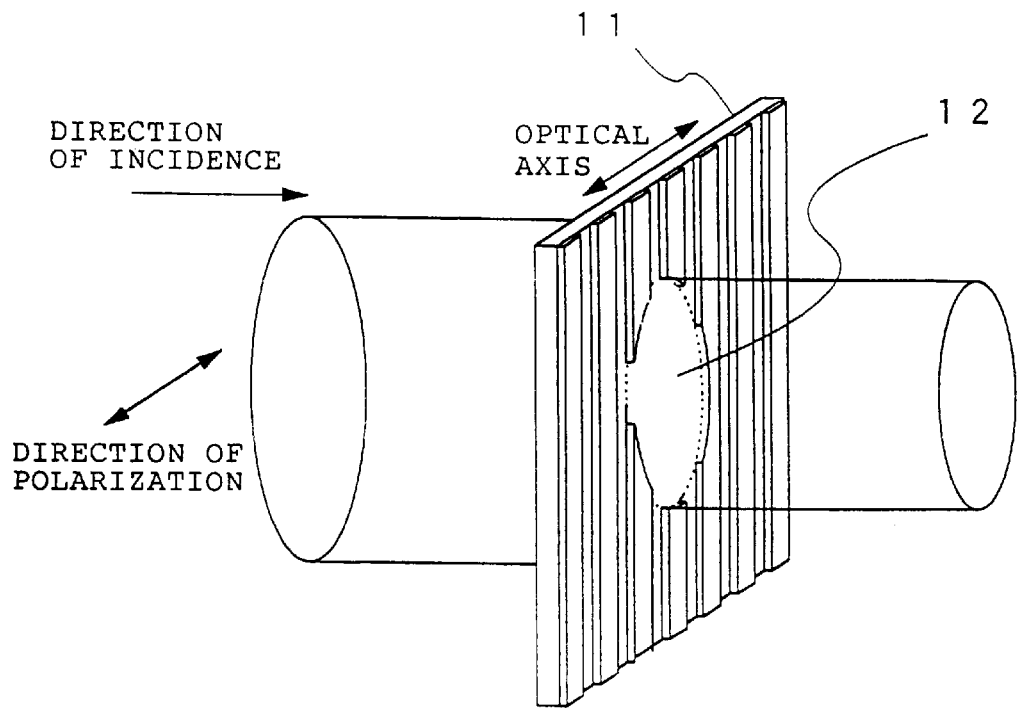

Hence, as shown in FIG. 4(a), the optical beam polarized in the orientation perpendicular to the optical axis of the double refracting plate 11, that is, the ordinary ray passes through the double refracting thin plate. On the other hand as shown in FIG. 4(b), the optical beam polarized in the orientation parallel to the optical axis of the double refracting thin plate 11, that is, the extraordinary ray is diffracted on the diffraction grating pattern and only the optical beam directed to the circular region 12 passes through the double refracting thin plate 11, so that the extraordinary ray passes therethrough with the same pupil diameter as the diameter of the circular region 12.

TABLE 1

| | Transmittance (%) of double refracting thin plate | | | | | |
|---|---|---|---|---|---|---|
| | Ordinary Ray | | | Extraordinary Ray | | |
| Sample | 0-order | Plus 1st-order | Minus 1st-order | 0-order | Plus 1st-order | Minus 1st-order |
| 1 | 94.4 | 0.0 | 0.0 | 1.5 | 35.3 | 35.2 |
| 2 | 94.3 | 0.0 | 0.0 | 0.8 | 35.4 | 35.3 |
| 3 | 93.7 | 0.0 | 0.0 | 1.8 | 34.7 | 34.6 |
| 4 | 94.3 | 0.0 | 0.0 | 0.9 | 35.4 | 35.3 |
| 5 | 93.7 | 0.0 | 0.0 | 1.5 | 34.9 | 34.8 |
| 6 | 94.1 | 0.0 | 0.0 | 0.8 | 35.1 | 34.9 |
| 7 | 94.2 | 0.0 | 0.0 | 1.7 | 35.1 | 34.9 |
| 8 | 94.1 | 0.0 | 0.0 | 0.8 | 35.5 | 35.4 |
| 9 | 93.2 | 0.0 | 0.0 | 1.3 | 34.9 | 34.6 |
| 10 | 93.7 | 0.0 | 0.0 | 0.8 | 35.4 | 35.1 |
| Average | 94.0 | 0.0 | 0.0 | 1.2 | 35.2 | 35.0 |

Table 1 shows measured values of the transmittance of light incident on the diffraction grating patterns of the double refracting thin plate. In the experiments the thickness $d_2$ of the ion exchange region 13 of the double refracting thin plate 3 in FIG. 3 was 9.5 μm, the thickness $d_3$ of the dielectric film 14 was 1.85 μm, the pitch of the diffraction grating pattern was 12 μm and the wavelength λ of the incident optical beam was 636 nm. And the transmittance of each of zero-order and plus and minus first-order diffracted waves (zero-order and plus and minus first-order light components) was measured for the ordinary and extraordinary rays of light for each sample.

As seen from Table 1, when the ordinary rays are incident on the double refracting thin plate 5, the transmittance of the zero-order rays of light is 94.0% on the average and the transmittance of the plus and minus first-order rays of light is 0.0%—this indicates that almost all the rays of incident light pass through the double refracting thin plate 5 without diffraction by the diffraction grating pattern.

In the case of the extraordinary rays of light, the transmittance of the zero-order rays of light through the double refracting thin plate 5 is 1.2% on the average, the transmittance of the plus first-order rays of light 35.2% and the transmittance of the minus first-order rays of light 35.0%. From this it can be seen that substantially no zero-order rays of light, which are direct transmitted rays of the incident light, are produced but instead the incident light appears as the plus and minus first-order rays of light after the passage through the double diffracting thin plate 5.

The above experimental results also indicate that the double refracting thin plate 5 permits the passage therethrough of the ordinary ray of the optical beams travelling in the same orientation as the optical axis of the incident light but inhibits the passage therethrough of the extraordinary ray.

The objective lens 6 is to converge incident light on the point of image formation in the recording plane of the optical recording medium 7. The double refracting thin plate 5 and the objective lens 6 are assembled by a holder 15 into a unitary structure.

Next, a description will be given of the operation of the optical pickup described above.

In the first place, the halfwave plate 4 is held off the optical path of the incident light. The optical beam emitted from the light source 1 is converted by the collimator lens 2 into a parallel beam, which passes through the beam splitter 3 and then falls on the double refracting thin plate 5. In this instance, the orientation of polarization of the optical beam incident on the double refracting thin plate 5 is perpendicular to the optical axis thereof.

Since the double refracting thin plate 5 has the diffraction grating pattern formed around the central circular region 12 as referred to previously, the beam diameter of the linearly polarized light incident on the double refracting thin plate 5 is the same as the diameter of the optical beam having passed through the beam splitter 3 (a first pupil diameter). On the other hand, when the halfwave plate 4 is placed on the optical path, the direction of polarization of the linearly polarized light toward the double refracting thin plate 5 rotates 90 degrees, producing an extraordinary ray with respect to the double refracting thin plate 5. As a result, the linearly polarized light incident on the double refracting thin plate 5 is diffracted by the diffraction grating pattern and only the optical beam passing through the circular region 12 passes through the double refracting thin plate 5 with the same pupil diameter (a second pupil diameter) as the diameter of the circular region 12.

Figure 5:
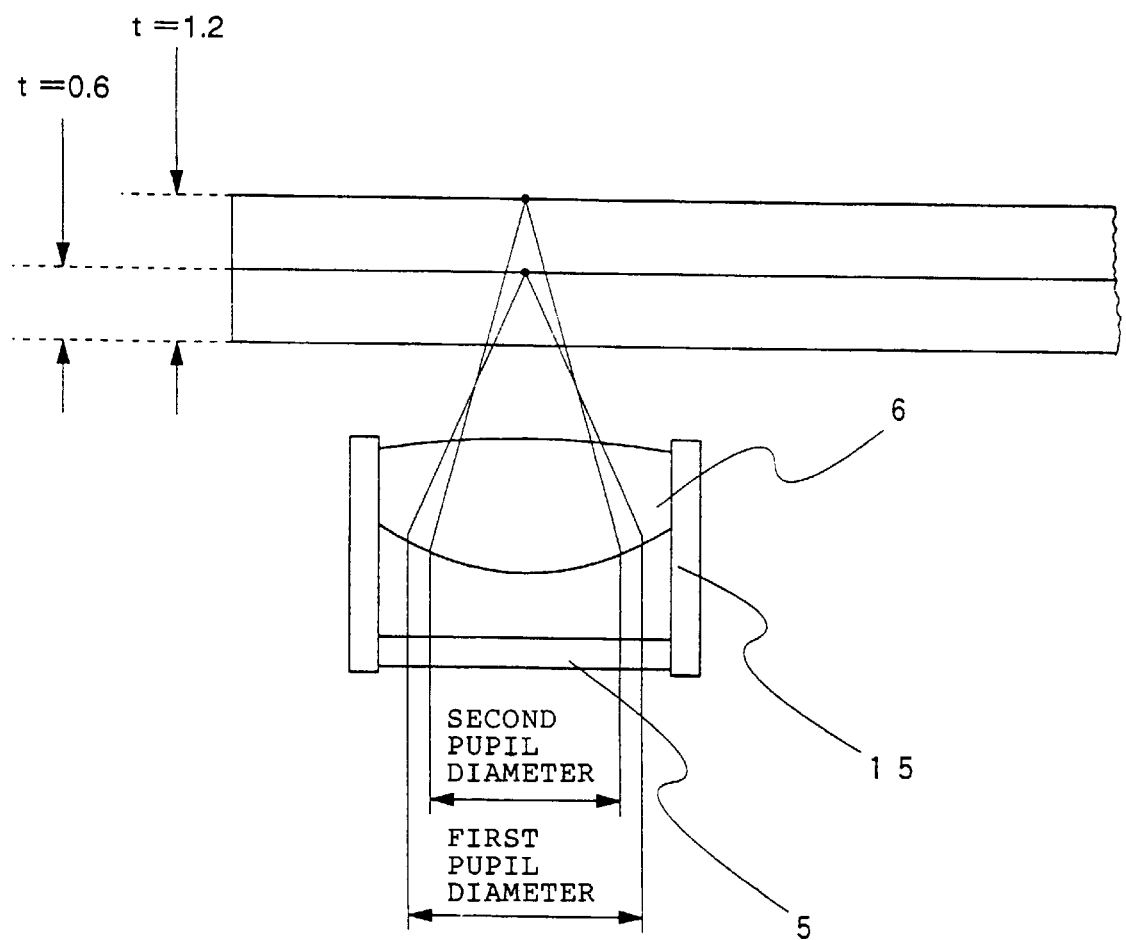
FIG. 5 is a schematic diagram for explaining how to switch between focal lengths in the optical pickup according to the present invention.

Then, as shown in FIG. 5, the optical beam having passed through the double refracting thin plate 5 falls on the objective lens 6, by which it is converged on the point of image formation to form an optical spot as a focal point in the recording plane of the optical recording medium 7. In this case, since the objective lens 6 has the property that its focal length increases or decreases, depending on whether the pupil diameter of the incident optical beam is large or small, the focal length for the incident optical beam of the first pupil diameter is short and the focal length for the optical beam of the second pupil diameter is long.

The optical beam reflected from the recording plane of the optical recording medium 7 passes through the objective lens 6 and double refracting thin plate 5 again and falls on the beam splitter 3, by which a portion of the incident light to the beam splitter 3 is reflected to the photodetector 10 through the converging lens 8 and the cylindrical lens 9. Thus, information recorded on the optical recording medium 7 can be read out.

In the case of playing back an optical recording medium (CD) of a 1.2 mm thickness through the use of optical pickup described above, the halfwave plate 4 is placed on the optical axis of the double refracting thin plate 5 so that the orientation of polarization of linearly polarized light incident thereon turns into parallel relation to the optical axis of the double refracting thin plate 5, and consequently the incident light on its diffraction pattern is diffracted. As a result, the diameter of the optical beam passing through the double refracting thin plate 5 becomes equal to the diameter (the second pupil diameter) of the circular region 12 formed centrally thereof and a point of image formation is created with a long focal length as depicted in FIG. 5, forming a light spot on the optical recording medium 7.

In the case of playing back an optical recording medium (DVD) of a 0.6 mm thickness, the halfwave 4 is held off the optical axis of the double refracting thin plate 5. The orientation of polarization of the linearly polarized light directed toward the double refracting thin plate 5 is perpendicular to the optical axis thereof and the optical beam from the light source 1 falls on the objective lens 6 while retaining its diameter with which it emerged from the collimator lens 2 (the first pupil diameter). Hence, as shown in FIG. 5, a point of image formation is created with a short focal length to form a light spot on the optical recording medium 7.

The above embodiment has been described to place the halfwave plate 4 on the optical axis of the double refracting thin plate 5 for incidence thereon of light with the first pupil diameter and to keep the halfwave plate 4 at its retracted position off the optical axis for obtaining incident light with the second pupil diameter. By rotating the orientation of polarization of light incident on the halfwave plate 4 through 90 degrees from the direction of polarization in the above embodiment, however, it is also possible to obtain the second pupil diameter with the halfwave plate 4 held on the optical axis of the double refracting thin plate 5 and the first pupil diameter with the halfwave plate 4 at its retracted position.

Figure 6:
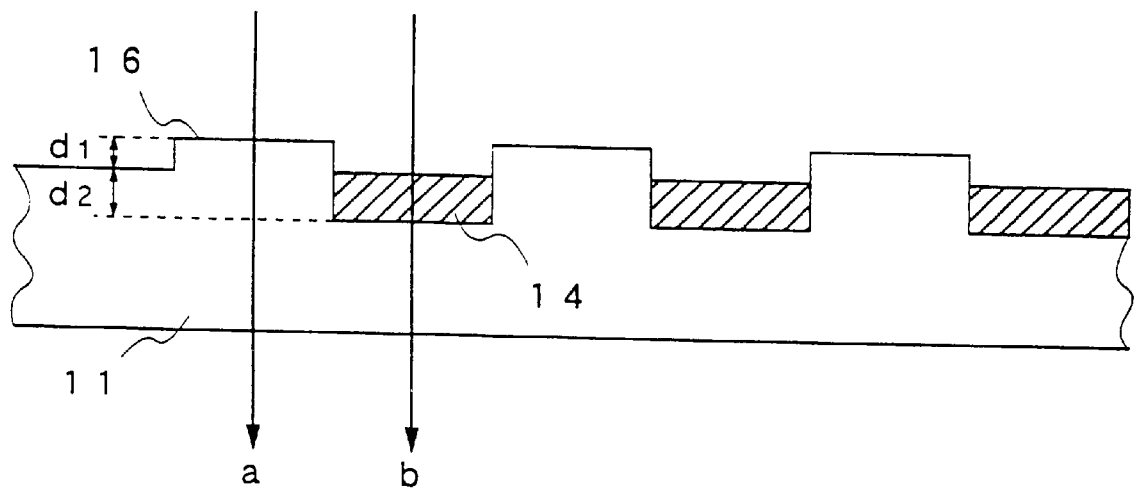
FIG. 6 is a sectional view for explaining another example of the thin double refractor according to the present invention.

FIG. 6 is a sectional view illustrating another example of the double refracting thin plate 5. As shown, the double refracting plate 11 has on its main surface a diffraction grating pattern formed by projections and depressions 16, each projection having a predetermined width, a predetermined length and a thickness $d_1$ in the direction of the optical axis of light incident thereon and each depression having an ion exchange region 14 of a thickness $d_2$ in the direction of the optical axis of the incident light.

Of rays of light that the diffraction grating pattern allows to pass therethrough, as referred to previously, a direct transmitted wave (a zero-order diffracted wave) has a transmittance $I_0$ given by $$I_0 = \cos^2(\delta/2)$$

where $\delta$ is an optical phase difference between optical paths a and b. The phase difference differs between a polarized component perpendicular to the optical axis of the double refractor plate 5 (an ordinary ray) and a polarized component parallel to the above optical axis (an extraordinary ray), and the phase difference $\delta_o$ for the ordinary ray and the phase difference $\delta_e$ for the extraordinary ray are given as follows:

$$\delta_o = 2\pi/\lambda\{(n_{1o}-1)d_1 + (n_{1o}-n_{2o})d_2\}$$

$$\delta_e = 2\pi/\lambda\{(n_{1e}-1)d_1 + (n_{1e}-n_{2e})d_2\}$$

where $n_{1o}$ is the refractive index of the double refracting thin plate 5 for the ordinary ray, $n_{1e}$ the refractive index of the double refractor plate 5 for the extraordinary ray, $n_{2o}$ the refractive index of the ion exchange region 14 for the ordinary ray and $n_{2e}$ the refractive index of the ion exchange region 14 for the extraordinary ray.

By setting the thicknesses $d_1$ and $d_2$ so that $(n_{1o}-1)d_1 + (n_{1o}-n_{2o}) = \lambda/2$, the transmittance $I_{0o}$ of the diffraction grating pattern for the ordinary ray becomes zero, inhibiting the passage therethrough of all the zero-order diffracted waves. By setting $d_1$ and $d_2$ so that $(n_{1o}-1)d_1 + (n_{1o}-n_{2o})d_2 = 0$, the transmittance $I_{0e}$ of the diffraction grating pattern for the extraordinary ray becomes one, allowing the passage therethrough of all the zero-order diffracted waves.

Figure 7A:
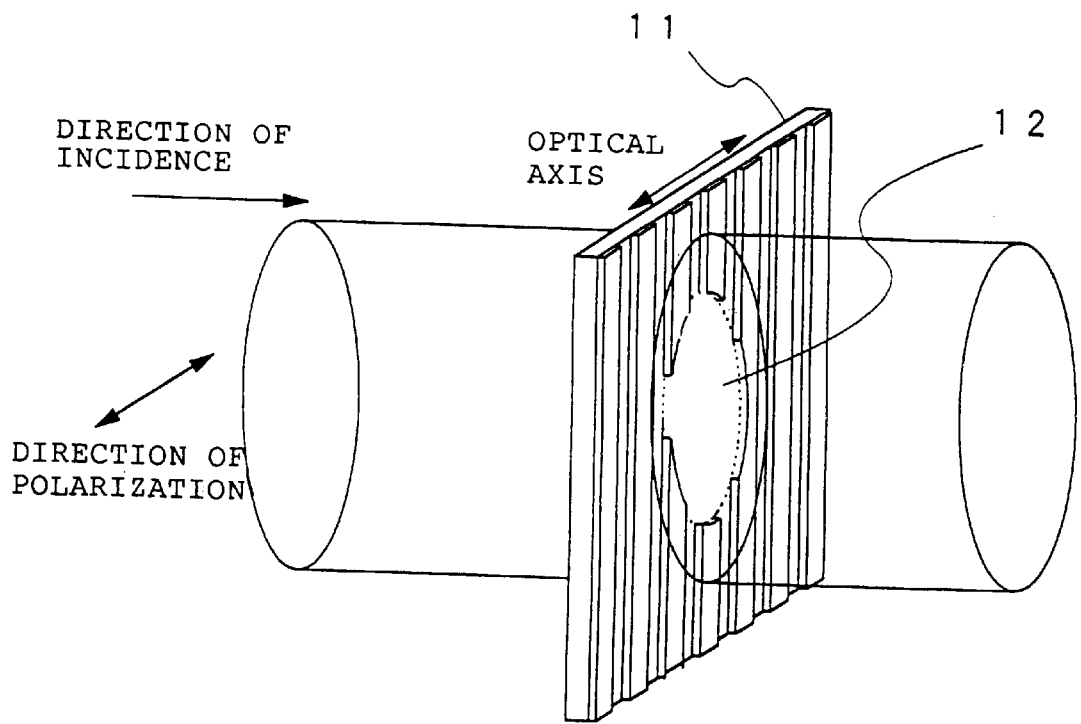
FIG. 7 is a perspective view for explaining the function of the thin double refractor shown in FIG. 6.
Figure 7B:
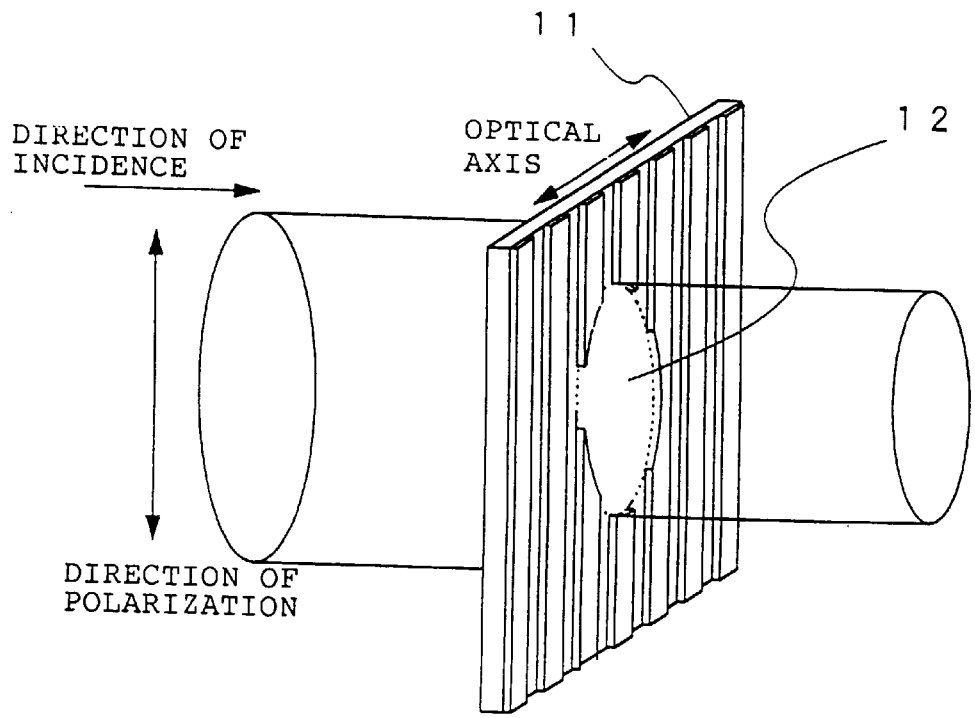
Figure 8:
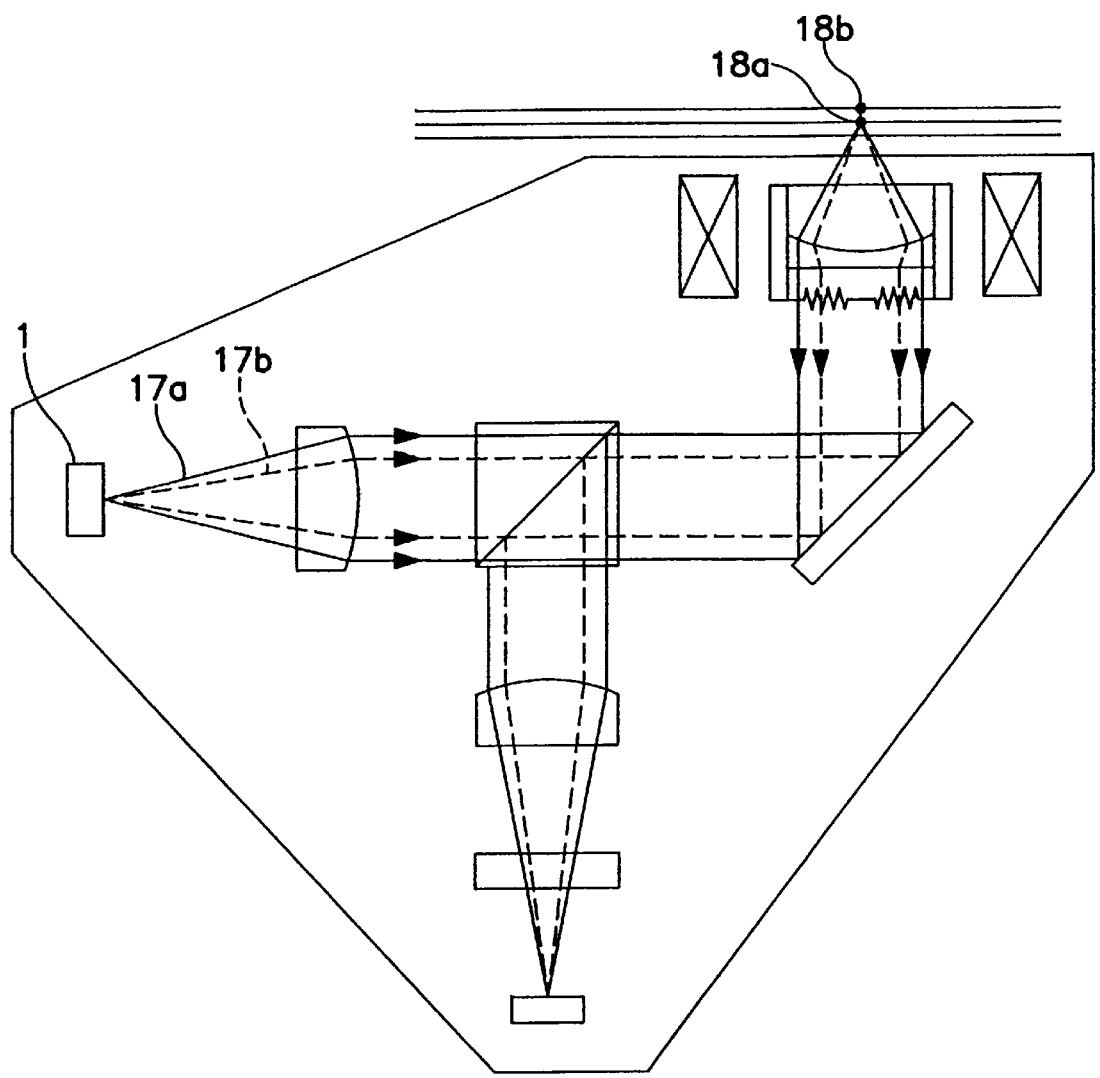
FIG. 8 is a diagram schematically showing the configuration of a conventional optical pickup.

Hence, as shown in FIG. 7(*b*), the optical beam polarized in the orientation perpendicular to the optical axis of the double refracting plate 11, that is, the ordinary ray is diffracted on the diffraction grating pattern and only the optical beam directed to the circular region 12 passes through the double refracting thin plate 5, so that the ordinary ray passes therethrough with the same pupil diameter as the diameter of the circular region 12. On the other hand, as shown in FIG. 7(*a*), the optical beam polarized in the orientation parallel to the optical axis of the double refracting thin plate 5, that is, the extraordinary ray is allowed to pass through the double refracting thin plate 11.

The double refracting thin plate 11 of the above construction is reverse from the thin plate 5 described previously in terms of the relation between the orientation of polarization of the incident light and its pupil diameter but has the same function as does the latter. Thus, the double refracting thin plate 11 can be used to change the pupil diameter according to the orientation of polarization of the incident light and hence change the focal length to the optical recording medium 7.

While in the above the orientation of polarization of light for incidence on the double refracting thin plate 5 has been described to be changed by selectively holding the halfwave plate 4 in or out of the optical path, it Is also possible to employ a construction in which the orientation of polarization of the incident linearly polarized light is changed, for example, by rotating a polarized beam splitter 90 degrees about the optical axis or by changing the voltage that is applied to a liquid crystal panel.

Additionally, the circular region 12 may be formed as a polygonal region.

As described above, the optical pickup according to the present invention selectively switches the polarized component of light from the light source to change the pupil diameter of the optical beam to thereby select the focal length in accordance with the thickness of the optical recording medium; hence, the optical pickup is simpler in construction than in the prior art and permits significant miniaturization of the playback system. Furthermore, since the focal length does not undergo a marked change due to an error in the output of the light source, the optical pickup operates with high stability.

It will be apparent that many modifications and variations may be effected without departing from the scope of the novel concepts of the present invention.

What is claimed is:

1. An optical element comprising:

a double refracting thin plate; and a diffraction grating pattern formed on said double refracting thin plate around a centrally-disposed transparent region of a desired shape, said diffraction grating pattern being composed of equally spaced ion exchange regions each having a predetermined width, a predetermined length and a predetermined thickness in the orientation of the optical axis of incident light and dielectric films each formed over the entire area of the top of one of said ion exchange region;

wherein the thicknesses of said each ion region and said each dielectric film are selected such that said diffraction grating pattern allows the passage therethrough of an ordinary ray incident on said double refracting thin plate and inhibits the passage therethrough of a zero-order diffracted wave of an incident extraordinary ray.

2. The optical element of claim 1, wherein, letting the refractive indexes of said double refracting thin plate for said ordinary and extraordinary rays be represented by $n_{1o}$ and $n_{1e}$, the refractive indexes of said each ion exchange region for said ordinary and extraordinary rays by $n_{2o}$ and $n_{2e}$, the thickness of said each ion exchange region by $d_2$ and the refractive index and thickness of said each dielectric film by $n_3$ and $d_3$, respectively, said thicknesses $d_2$ and $d_3$ of each ion exchange region and each dielectric film are set at values that satisfy the following conditions:

$$(n_{1o}-n_{2o})d_2+(1-n_3)d_3=0$$

$$(n_{1e}-n_{2e})d_2+(1-n_3)d_3=\lambda/2$$

3. An optical element comprising:

a double refracting thin plate; and a diffraction grating pattern formed on said double refracting thin plate around a centrally-disposed transparent region of a desired shape, said diffraction grating pattern being composed of equally spaced projections and depressions of a double refractive material each having a predetermined width, a predetermined length and a predetermined thickness in the orientation of the optical axis of incident light and ion exchange regions each formed in one of said depressions to a predetermined thickness in said direction of the optical axis of said incident light;

wherein the thicknesses of said each projection and said each ion region are selected such that said diffraction grating pattern allows the passage therethrough of an extraordinary ray incident on said double refracting thin plate and inhibits the passage therethrough of a zero-order diffracted wave of an incident ordinary ray.

4. The optical element of claim 3, wherein, letting the refractive indexes of said each projections for said ordinary and extraordinary rays be represented by $n_{1o}$ and $n_{1e}$, the thickness of said each projection by $d_1$, the refractive indexes of said each ion exchange region for said ordinary and extraordinary rays by $n_{2o}$ and $n_{2e}$, and the thickness of said each ion exchange region by $d_2$, said thicknesses $d_1$ and $d_2$ of said each projection and each ion exchange region are set at values that satisfy the following conditions:

$$(n_{1o}-1)d_1+(n_{1o}-n_{2o})d_2=\lambda/2$$

$$(n_{1e}-1)d_1+(n_{1e}-n_{2e})d_2=0$$

5. The optical element of any one of claims 1 though 4, wherein said centrally-disposed region of said double refracting thin plate is made of a double refractive material.

6. The optical element of any one of claims 1 though 4, wherein said centrally-disposed region of said double refracting thin plate is made of a double refractive material and circular in shape.

7. An optical pickup comprising:

a light source;

a non-polarized beam splitter disposed on the optical path of light that is emitted from said light source;

an optical element disposed on said optical path, said optical element being composed of a double refracting thin plate and a diffraction grating pattern formed on said double refracting thin plate around a centrally-disposed transparent region of a desired shape, said diffraction grating pattern being composed of equally spaced ion exchange regions each having a predetermined width, a predetermined length and a predetermined thickness in the orientation of the optical axis of incident light and dielectric films each formed over the entire area of the top of one of said ion exchange region, and the thicknesses of said each ion region and said each dielectric film being selected such that said diffraction grating pattern allows the passage therethrough of an ordinary ray incident on said double refracting thin plate and inhibits the passage therethrough of a zero-order diffracted wave of an incident extraordinary ray;

an objective lens disposed on said optical path; and orientation-of-polarization changing means disposed on said optical path;

wherein said orientation-of-polarization changing means is interposed between said non-polarized beam splitter and said optical element to thereby change the orientation of polarization of linearly polarized light incident on said optical element to control the beam diameter of light that is emitted therefrom, selectively changing the focal length of light that is converged by said objective lens.

8. An optical pickup comprising:

a light source;

a non-polarized beam splitter disposed on the optical path of light that is emitted from said light source;

an optical element disposed on said optical path, said optical element being composed of a double refracting thin plate, and a diffraction grating pattern formed on said double refracting thin plate around a desired transparent region centrally thereof, said diffraction grating pattern being composed of equally spaced projections and depressions of a double refractive material each having a predetermined width, a predetermined length and a predetermined thickness in the direction of the optical axis of incident light and ion exchange regions each formed in one of said depressions to a predetermined thickness in said direction of the optical axis of said incident light, and the thicknesses of said each projection and said each ion region are selected such that said diffraction grating pattern allows the passage therethrough of an extraordinary ray incident on said double refracting thin plate and inhibits the passage therethrough of a zero-order diffracted wave of an incident ordinary ray;

an objective lens disposed on said optical path; and orientation-of-polarization changing means disposed on said optical path;

wherein said orientation-of-polarization changing means is interposed between said non-polarized beam splitter and said optical element to thereby change the orientation of polarization of linearly polarized light incident on said optical element to control the beam diameter of light that is emitted therefrom, selectively changing the focal length of light that is converged by said objective lens.

* * * * *